(12) United States Patent
Wingard

(10) Patent No.: US 7,784,719 B1
(45) Date of Patent: Aug. 31, 2010

(54) METHODS OF RECYCLING POST-CONSUMER CARPET

(75) Inventor: Donald A. Wingard, Scranton, SC (US)

(73) Assignee: Wellman Plastics Recycling, LLC, Johnsonville, SC (US)

( * ) Notice: Subject to any disclaimer, the term of this patent is extended or adjusted under 35 U.S.C. 154(b) by 1106 days.

(21) Appl. No.: 11/425,498

(22) Filed: Jun. 21, 2006

Related U.S. Application Data

(60) Provisional application No. 60/692,362, filed on Jun. 21, 2005.

(51) Int. Cl.
*B02C 1/00* (2006.01)

(52) U.S. Cl. .................. 241/20; 241/21; 241/24.19; 241/24.29; 241/DIG. 38

(58) Field of Classification Search ............ 241/15, 241/20, 21, 24.12, 24.19, 24.28, 24.29, 24.18, 241/DIG. 38
See application file for complete search history.

(56) References Cited

U.S. PATENT DOCUMENTS

| | | | |
|---|---|---|---|
| 3,843,060 A * | 10/1974 | Colburn ............... | 241/19 |
| 4,127,476 A | 11/1978 | Iannazzi | |
| 4,344,843 A | 8/1982 | Leifeld | |
| 4,431,530 A | 2/1984 | Syben | |
| 4,634,522 A | 1/1987 | Edholm et al. | |
| 4,853,112 A | 8/1989 | Brown | |
| 5,230,473 A | 7/1993 | Hagguist et al. | |
| 5,281,278 A | 1/1994 | Stein | |
| 5,289,921 A | 3/1994 | Rodrigo et al. | |
| 5,351,832 A | 10/1994 | Abbott et al. | |
| 5,366,094 A | 11/1994 | Stein | |
| 5,409,118 A | 4/1995 | Bielagus et al. | |
| 5,411,142 A | 5/1995 | Abbott et al. | |
| 5,497,949 A | 3/1996 | Sharer | |
| 5,518,188 A | 5/1996 | Sharer | |
| 5,535,945 A | 7/1996 | Sferrazza et al. | |
| 5,598,980 A | 2/1997 | Dilly-Louis et al. | |
| 5,722,603 A | 3/1998 | Costello et al. | |
| 5,908,164 A | 6/1999 | Robinson et al. | |
| 5,916,410 A | 6/1999 | Goulet et al. | |
| 5,975,309 A | 11/1999 | Mitsuda et al. | |
| 6,029,916 A | 2/2000 | White | |
| 6,059,207 A | 5/2000 | Costello et al. | |

(Continued)

FOREIGN PATENT DOCUMENTS

DE   33 43 788   6/1985

(Continued)

OTHER PUBLICATIONS

Dr. Roger A. Smith and Dr. Brian E. Gracon; *Polyamide 66 and 6 Chemical Recycling*; Recycle '95; Feb. 1995; 17 pages total; E.I. DuPont De Nemours & Co., Inc., Wilmington, Delaware.

(Continued)

*Primary Examiner*—Bena Miller
(74) *Attorney, Agent, or Firm*—Summa, Additon & Ashe, P.A.

(57) ABSTRACT

Disclosed are efficient and cost-effective methods of recovering primary construction materials from whole carpet. The present methods are particularly appropriate for recovering nylon or polyester face fibers from post-industrial, post-consumer carpet waste.

29 Claims, 2 Drawing Sheets

U.S. PATENT DOCUMENTS

| | | | |
|---|---|---|---|
| 6,126,096 | A | 10/2000 | Robinson et al. |
| 6,182,913 | B1 | 2/2001 | Howe et al. |
| 6,250,575 | B1 | 6/2001 | White |
| 6,379,489 | B1 | 4/2002 | Goulet et al. |
| 6,398,138 | B1 | 6/2002 | Robinson et al. |
| 6,752,336 | B1 | 6/2004 | Wingard |
| 6,883,667 | B1 | 4/2005 | Lindsey |
| 6,883,668 | B1 | 4/2005 | Lindsey |
| 2001/0032806 | A1 | 10/2001 | Flores |
| 2008/0113146 | A1* | 5/2008 | Wright et al. ............ 428/95 |

FOREIGN PATENT DOCUMENTS

| | | |
|---|---|---|
| FR | 2 301 362 | 2/1976 |
| GB | 2 157 198 A | 10/1985 |
| JP | 2002018849 A | 1/2002 |
| WO | WO 94/01219 | 1/1994 |

OTHER PUBLICATIONS

Forsberg, Inc., *Pneumatic Aspirators*, product literature (undated), Forsberg, Inc., 1 page, Thief River Falls, Minnesota.

American International MFG., *Cascade Pneumatic Separator*, product literature (undated), 1 page, American International Mfg., Woodland, California.

American International MFG., 10 Series Airleg *Pneumatic Separator*, product literature (undated), 2 pages, American International Mfg., Woodland, California.

Global Equipment Marketing Inc., Magnetics Division, *Eddy Current Non-Ferrous Separators*, product literature (undated), 2 pages, Global Equipment Marketing, Inc.

* cited by examiner

METHODS OF RECYCLING POST-CONSUMER CARPET

CROSS-REFERENCE TO PRIOR APPLICATION

This application hereby claims the benefit of and incorporates entirely by reference commonly owned provisional patent application Ser. No. 60/692,362, for Methods of Recycling Post-Consumer Carpet, filed Jun. 21, 2005.

BACKGROUND OF THE INVENTION

Huge quantities of used post-consumer carpet are landfilled each year. Disposing of whole carpet in this way is not only expensive, but also runs counter to an increasing emphasis on environmental stewardship. Merely discarding whole carpet precludes recycling the useful materials present in post-consumer carpet.

Various mechanical separation processes have been proposed to separate and recover materials from whole carpet. The processes often require complicated and expensive integration of numerous unit operations, and yet achieve modest results. In particular, efforts to recover materials from whole carpet most often subject a feedstock of post-consumer, whole carpet to one of numerous separation techniques. Unfortunately, some materials (e.g., adhesives) and impurities (e.g., dirt) present in used carpet necessitate numerous washing and screening steps. These impede the effectiveness of most separation processes. Reduced efficiency frequently renders recovery of the desired components costly, and thus impractical.

One method for recovering carpet construction materials is hot-wire skimming from the carpet surface (e.g., shearing nylon pile). See e.g., U.S. Pat. No. 6,059,207 (Costello et al.). This approach, however, recovers only the face fiber that extends above the carpet backing. Consequently, it is not an effective method for recovering the significant portion of face fiber found below the carpet backing.

Other processes attempt to separate and refine carpet components by first reducing the size of the whole carpet and thereafter separating the component materials via various unit operations, such as elutriators, centrifuges, hydrocyclones, and settlers. See e.g., U.S. Pat. No. 5,230,473 (Hagguist et al.); U.S. Pat. No. 5,535,945 (Sferrazza et al.); U.S. Pat. No. 5,598,980 (Dilly-Louis et al.); U.S. Pat. No. 5,722,603 (Costello et al.); and U.S. Pat. No. 5,916,410 (Goulet et al.); and U.S. Pat. No. 6,379,489 (Goulet et al.). Each kind of operation carries its own advantages and disadvantages, but as of yet none has been employed in a way that provides cost-effective reclamation of carpet materials.

Each of the aforementioned U.S. patents is hereby incorporated by reference in its entirety.

In contrast to prior carpet reclamation processes, commonly assigned U.S. Pat. No. 6,752,336 (Wingard) discloses cost-effective methods to separate and recover the components of carpet waste, particularly post-industrial, pre-consumer carpet waste. In this regard, U.S. Pat. No. 6,752,336 provides efficient methods for recycling post-industrial, pre-consumer carpet such that the recovered materials are sufficiently pure to facilitate their direct use in other products. Accordingly, the application of aspects of the separation methods disclosed U.S. Pat. No. 6,752,336 to whole carpet materials could provide efficiencies with respect to the reclamation of even post-industrial, post-consumer carpet.

SUMMARY OF THE INVENTION

Therefore, it is an object of the present invention to provide an efficient and cost-effective method for recovering component materials from whole carpet.

It is another object of the present invention to provide an efficient and cost-effective method for recovering component materials from post-industrial, post-consumer whole carpet.

It is yet another object of the present invention to provide a cost-effective method for recovering the component materials of whole carpet that includes olefin (e.g., polypropylene) pile and backing.

It is yet another object of the present invention to separate the components of whole carpet in such a manner as to achieve an output stream of olefin backing fiber that is pure enough to facilitate direct processing of the recovered olefin backing fiber.

It is yet another object of the present invention to separate the components of whole carpet in such a manner as to achieve an output stream of polymer face fiber and binder material that can be used as a polymer resin intermediate.

It is yet another object of the present invention to separate the components of whole carpet in such a manner as to achieve an output stream of polymer face fiber and binder material that can be used in engineering resin compositions.

It is yet another object of the present invention to provide an engineering resin that is made from post-consumer carpet.

It is yet another object of the present invention to provide a low-cost filled engineering resin that includes a substantial fraction of post-consumer resin (PCR).

It is yet another object of the present invention to lessen the environmental impact of disposing of carpet waste in landfills by providing an economically viable recycling method for whole carpet.

The foregoing, as well as other objectives and advantages and the manner in which the same are accomplished, is further specified within the following detailed description and its accompanying figures.

DETAILED DESCRIPTION

Figure 1:
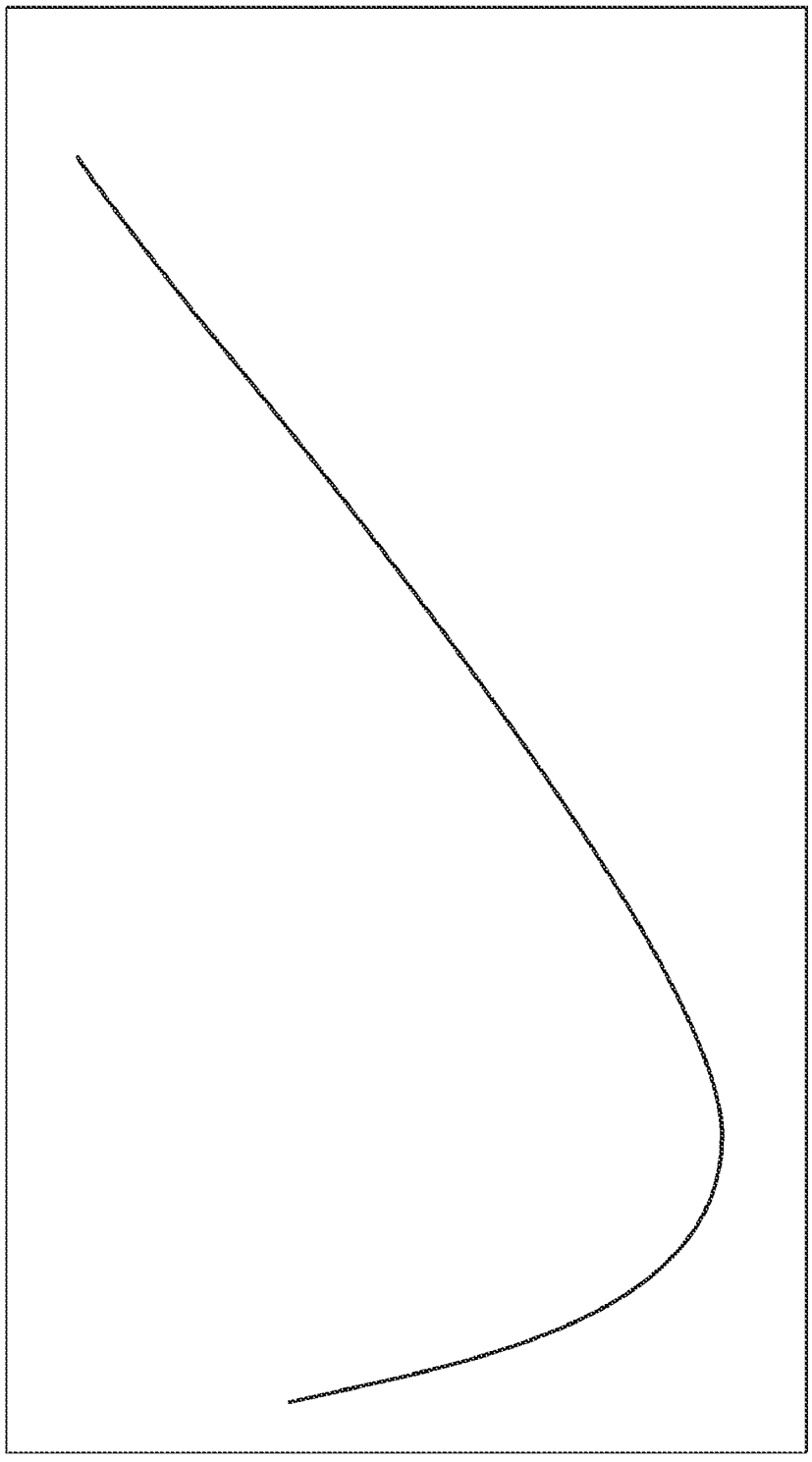
FIG. 1 qualitatively describes carpet separation costs as a function of fiber size.

In one aspect, the invention relates to polymer compositions that are formed from reclaimed carpet materials, such as from post-industrial, post-consumer whole carpet. These carpet materials include, for instance, polyamide face fibers and polyolefin fabric backing (e.g., polypropylene fibers). Such polymer compositions are useful, for instance, as intermediates to filled engineering resins.

In another aspect, the invention relates to methods of reclaiming carpet materials from whole carpet. This is accomplished, for example, by reducing the whole carpet into fragmented carpet materials (i.e., pile, backing, and binder), further reducing the fragmented carpet materials into size-reduced fibers and binder, slurrying the size-reduced fibers and binder in an aqueous liquid medium (e.g., water), and then separating the size-reduced fibers and binder in a centrifuge.

In one embodiment of the method, a whole carpet that includes face fibers having a density greater than 1.0 g/cm$^3$, fibrous olefin fabric backing having a density less than 1.0 g/cm$^3$, and binder materials (e.g., mineral filler and adhesive) having an aggregate density greater than 1.0 g/cm$^3$, is mechanically disintegrated and screened. As will be recognized by those having ordinary skill in the art, post-consumer whole carpet will likely also include impurities, such as dirt, metal, and other debris. Mechanical disintegration (e.g., shredding) yields fragmented carpet materials that include face fibers and backing fibers, as well as residual binder materials that remain bound to the face and backing fibers. The associated screening removes loose particulate binder material and impurities (e.g., dirt and metal debris) from the fragmented carpet materials. In sum, the primary size reduction of the whole carpet is achieved via conventional "beating and screening" unit operations.

The fragmented carpet materials are further reduced (i.e., granulated) in secondary size-reduction operations to yield size-reduced face fibers and size-reduced olefin backing fibers, as well as residual binder materials (i.e., the filler and adhesive that was not removed during prior reduction). The size-reduced fibers and residual binder materials are then mixed in an aqueous liquid medium to form a slurry, which is thereafter centrifuged to separate the face fibers and residual binder materials from the olefin backing fibers.

In the United States, whole carpet includes a fabric backing—typically an olefin woven fabric—to which loops of polymer face fiber (i.e., pile) are secured both mechanically and chemically (e.g., via adhesives).

In this regard, polymer face fibers are typically nylon, which has a density of about 1.14 g/cm$^3$, but may also include either polyester, which has a density of about 1.33 g/cm$^3$, or polypropylene, which has a density of between about 0.91 and 0.95 g/cm$^3$. As used herein, the term "nylon" is used to refer to polyamide polymers generally. With respect to carpet pile, however, those having ordinary skill in the art will know that polyamide face fiber is usually either nylon-6 or nylon-6,6. Likewise, with respect to carpet, polyester face fiber is often polyethylene terephthalate or polybutylene terephthalate.

A typical olefin used in fibrous carpet backing is polypropylene. In this regard, olefin fabric backing often includes a primary backing, which is often formed from a woven polypropylene fabric, and a secondary backing, which is typically formed from a looser, web-like construction of polypropylene or even jute. As used herein, the term "olefin" characterizes a synthetic polymer whose repeating unit is derived from a monomer having a carbon-carbon double bond (e.g., ethylene and propylene).

As noted, adhesive helps secure carpet pile to the fibrous olefin backing. A typical adhesive is latex, which has a density of about 0.9-1.1 g/cm$^3$. In addition, a heavier filler material (e.g., a mineral filler) is included between the primary backing and the secondary backing to provide weight to the whole carpet, thereby increasing its density and durability. A typical filler is calcium carbonate, which has a density of about 2.7-2.9 g/cm$^3$. As used herein, the term "binder" embraces both adhesive and filler.

Whole carpet that is sold and used in the United States might be between about 40 and 60 weight percent pile, between about 10 and 15 weight percent backing, and between about 35 and 50 weight percent binder. Furthermore, binder that includes both latex adhesive and calcium carbonate filler would likely be at least 70 weight percent calcium carbonate. Moreover, as the binder's weight ratio of filler (e.g., calcium carbonate) to adhesive (e.g., latex) is about 4:1 or so, the binder possesses an aggregate density greater than 1.0 g/cm$^3$.

Those having ordinary skill in the art will know that whole carpet may also include, for example, dyes, antistatic agents, and finishes. As discussed herein, finishes, which are applied during manufacturing, have been observed to cause mixing and foaming problems during centrifugal separation.

As used herein, the term "post-industrial, pre-consumer whole carpet" means whole carpet that has never been installed for consumer use. Such pre-consumer whole carpet includes, without limitation, carpet manufacturer trimmings, rejects, and overruns. Conversely, as used herein, the term "post-consumer whole carpet" includes whole carpet that has been installed in homes or businesses. Those having ordinary skill in the art will appreciate that most post-consumer whole carpet includes debris, such as dirt, and contaminants, such as detergents and surfactants from in situ cleanings. Indeed, the weight of whole carpet may increase by between about 10 and 20 percent after prolonged consumer use.

As noted, the whole carpet feedstock will typically include substantially more face fiber and binder than olefin fabric backing. Indeed, a typical pre-consumer whole carpet feedstock might include about 50 weight percent face fibers and about 15 weight percent olefin fabric backing, with binder making up the remaining 35 weight percent. By way of comparison, a post-consumer whole carpet may include between about 40 and 45 weight percent face fibers, between about 10 and 15 weight percent olefin fabric backing, between about 30 and 35 weight percent binder, and between about five and 20 weight percent debris (e.g., dirt) and other impurities.

The whole carpet feedstock is typically in rolls or otherwise oversized scrap. Consequently, to effect centrifugal separation, the feedstock is subjected to mechanical size-reduction processes to break down the whole carpet into its fibrous components (i.e., face fibers and olefin backing fibers), and screening to remove binder and debris (e.g., metal and dirt). With respect to the carpet feedstock, primary size reduction may be achieved by shredding (e.g., cutting and ripping in a shredder) and secondary size reduction may be achieved thereafter by granulating. Primary and secondary carpet size-reduction operations may be either a batch or continuous process.

Carpet shredding and screening (i.e., "beating and screening") may be achieved using conventional equipment and techniques. For example, post-consumer carpet may be cross-cut into chunks, which are then screened (e.g., via one-inch or two-inch screens) to remove loose binder materials and debris. Unlike binder materials, dirt and other debris are not bound within the carpet structure and so tend to be more readily removed during initial size reduction and screening operations.

In addition, subjecting the shredded post-consumer carpet to a stationary knife hog, a hammermill, or both, followed by more screening, separates the relatively larger face fibers and backing fibers from the relatively smaller binder materials and impurities. For instance, hammermill impaction is particularly effective at reducing binder knots (i.e., clumps of adhesive and filler bound to fibers).

In general, conventional shredding, impacting, and screening of the post-consumer carpet can effectively remove binder materials and debris, thereby yielding a fragmented carpet feedstock that includes much less than ten weight percent binder (e.g., about 5-7 weight percent adhesive and calcium carbonate) and much less than two weight percent debris (e.g., about 1-2 weight percent dirt).

The secondary size reduction (e.g., granulating) of the fragmented carpet feedstock can be achieved by subjecting it to a rotating blade classifier, which is characterized by rotating knives that integrate with stationary bed knives. In this regard, granulation yields size-reduced face fibers and size-reduced backing fibers, as well as residual binder materials and residual (i.e., trace) impurities.

Those having ordinary skill in the art will be familiar with additional means to disintegrate the whole carpet into fibrous components and such means are within the scope of the invention. See Perry and Green, *Perry's Chemical Engineers' Handbook* §20 (7th ed. 1997). In addition, U.S. Pat. No. 5,535,945 (Sferrazza et al.), U.S. Pat. No. 5,722,603 (Costello et al.), and U.S. Pat. Nos. 5,497,949 and 5,518,188 (Sharer) disclose dry size reductions that can be employed in practicing the present method, and each is hereby incorporated by reference in its entirety.

Those having ordinary skill in the art will appreciate that, in order to facilitate the achievement of high purity levels in the reclaimed polymer fiber, conventional carpet reclamation processes strive to minimize the amount of adhesive, filler, and impurities that pass through size-reduction and screening operations. Attaining high purity is costly, however, and can render complicated carpet recycling processes uneconomical. Indeed, this is underscored by the multi-million dollar failure of the "PA2000" enterprise, which commercialized the carpet recycling process of U.S. Pat. No. 5,598,980 (Dilly-Louis et al.).

That said, to remove additional binder from the face fibers and size-reduced backing fibers, acetic acid can be employed to dissolve calcium carbonate filler. Alternatively, the use of chemical softening agents and the like can yield size-reduced fibers with negligible binder concentrations. See U.S. Pat. No. 6,379,489 (Goulet et al.). Such additional steps, however, are costly and can render the economics of carpet reclamation untenable. As noted, conventional dry "beating in screening" unit operations can effectively reduce binder concentrations to well below ten weight percent.

Those having ordinary skill in the art will appreciate that olefin backing fabrics tend to granulate differently than face fibers. In particular, the size-reduced olefin backing fibers are generally longer and coarser than the size-reduced face fibers. Consequently, the size-reduced fiber may be adequately characterized by describing the face fiber fraction.

The mean length of the size-reduced face fibers is typically less than about 15 mm, more typically less than about 10 mm, and most typically between about 3 mm and 7 mm (e.g., 5 mm). It will be appreciated by those of ordinary skill in the art that the size-reduced face fibers have a distribution of sizes, including fiber fines. Accordingly, as used herein, mean length refers to number-average length, excluding fines that are less than 0.025 inch (i.e., about 0.6 mm). Likewise, the median length of the size-reduced face fibers, excluding fines that are less than 0.025 inch, is typically less than about 15 mm, more typically less than about 10 mm, and most typically between about 3 mm and 7 mm (e.g., 5 mm). The size-reduced olefin backing fibers will tend to be somewhat longer than the size-reduced nylon face fibers.

The desired size reduction can be achieved by screening the size-reduced fibers (and residual binder) during the size-reduction process. For example, it is expected that requiring the size-reduced fibers to pass through a screen having an effective screen size of less than about 20 mm (e.g., between about 3 mm and 20 mm) should yield size-reduced face fibers having a mean length of less than about 15 mm. Likewise, it is expected that screens having an effective screen size of between about 5 mm and 15 mm, and typically an effective screen size of between about 7 mm and 10 mm (e.g., 8 mm), should yield size-reduced face fibers having a mean length of less than about 10 mm, and typically between about 3 mm and 7 mm, respectively.

Those having ordinary skill in the art appreciate that to achieve size-reduced fibers the fragmented carpet materials can be subjected to successive granulation steps. For instance, the face fibers, backing fibers, and residual binder may be introduced to a first rotating blade classifier and associated screen having an effective screen size of less than about 20 mm (e.g., about 15 mm), and then exposed to a second rotating blade classifier and associated screen having an effective screen size of less than about 10 mm (e.g., about 8 mm). In this way, a series of two or more granulators can effectively size reduce pre-shredded (i.e., fragmented) whole carpet.

As used herein, the term "effective screen size" describes the diameter of the openings in screens having uniform circular screen apertures, which are preferred in practicing the present method. Those having ordinary skill in the art will appreciate that the term "effective screen size" is also intended to characterize screens having other kinds of aperture shapes based on performance that corresponds to that of screens having uniform circular screen apertures of a particular diameter. For example, a screen having non-circular openings has an effective screen size of 10 mm if it performs like a screen having uniform, 10-mm diameter, circular screen apertures.

Those having ordinary skill in the art will appreciate that the costs associated with recovering carpet materials are affected by fiber size. In other words, there is an inverse relationship between fiber size-reduction costs and centrifuge separation costs. In this regard, reducing expenditures associated with fiber size reduction will generally increase expenditures associated with centrifuging the relatively longer size-reduced fibers. Conversely, increasing expenditures associated with fiber size reduction will generally decrease expenditures associated with centrifuging the relatively shorter size-reduced fibers. FIG. 1 qualitatively describes carpet separation costs, including fiber size-reduction costs and centrifuging costs, as a function of fiber size.

After size reduction unit operations are completed, the size-reduced fibers, the residual binder, and an aqueous liquid medium—mostly water—are introduced into a mixing tank to form a size-reduced fiber slurry. The liquid medium typically has a specific gravity of about 1.0. The solution (i.e., size-reduced fiber slurry) typically contains less than ten weight percent solids (e.g., between two and five weight percent solids). (With respect to the size-reduced fibers, the solution typically includes less than five weight percent size-reduced fibers, perhaps between about one and two weight percent size-reduced fibers.)

The size-reduced fiber slurry may further contain a defoamer additive, such as Rhone-Poulenc's ANTROX L61. Defoamer helps to reduce the formation of foam, which is often caused by residual sizes and finishes and which can adversely affect the mixing of the size-reduced fibers, residual binder, and the aqueous liquid medium. The slurry may also contain other additives, such as detergents. A suitable detergent, which improves fiber wetting, is Oakite's OAKITE RC7A. Additives generally constitute less than about 0.1 weight percent of the size-reduced fiber slurry.

The size-reduced fiber slurry is fed (e.g., pumped) to a centrifuge, typically a single-cone centrifuge, to separate the face fiber and residual binder materials from the olefin backing fibers. As will be understood by those with ordinary skill in the art, a single-cone centrifuge may be used to separate differing materials based on their respective densities. A single-cone centrifuge suitable for use with the present invention is Alfa Laval's P5400 model. Effective separation of the carpet components occurs when the centrifuge is operated at about 2000-3000 RPMs, thereby subjecting the size-reduced fiber slurry to a G-force of at least 500 (i.e., 500 times the acceleration of standard gravity, or about 5000 m/s$^2$). In contrast, a simple sink-float density separation would subject the size-reduced fiber slurry to the acceleration of standard gravity (i.e., 9.81 m/s$^2$).

This continuous centrifugal separation yields two output streams, a relatively dry first output stream of mostly face fibers and residual binder materials and a wet second output stream of mostly water and olefin backing fibers. With respect to the residual binder materials, filler (e.g., calcium carbonate) is dense and thus separates into the first output stream of face fibers. And though latex adhesive has a density that is near that of water, it tends to be bound to the filler. Consequently, it, too, tends to separate with the filler in the first output stream of face fibers.

On a dry basis, at least about 80 percent of the first output stream is face fibers. Similarly, on a dry basis, at least about 90 percent of the second output stream is olefin backing fibers. On a wet basis, the first output stream is at least about 80 weight percent solids (i.e., about 15-20 percent or less water), whereas the second output stream is only about five weight percent solids. (Where a double-cone centrifuge is employed, both the first output stream and the second output stream are dewatered to at least about 80 weight percent solids.) It will be appreciated by those of ordinary skill in the art that the extent of separation and recovery of carpet components is affected by the composition and quality of the feedstock.

The recovered olefin backing fibers may be dewatered, then melt-extruded into pellets or filaments.

Likewise, the recovered face fibers and residual binder may be melt-extruded and pelletized, or melt-extruded and spun into filaments. Typically, the recovered face fibers are dried to a higher solid content before melt-extrusion. In this regard, melt-extrusion can take place at between about 260° C. and 300° C. (e.g., 280° C.). At such temperatures, some of the adhesive (e.g., latex adhesive) may be burned away from the recovered mixture of face fibers and residual binder. Consequently, the composition of the melt-extruded post-consumer resin (PCR) may differ somewhat as compared with the composition of the face fibers and residual binder that are recovered from the centrifugal separation.

Pelletized nylon that is recovered according to the present processes is especially useful as a filled engineering resin intermediate. In this regard, the calcium carbonate present in the residual binder reduces the additional filler (i.e., glass) that is required in the filled engineering resin.

In another embodiment of the carpet reclamation method, a post-consumer whole carpet that includes face fibers having a density greater than 1.0 g/cm$^3$ (e.g., nylon or polyester) and fibrous fabric backing having a density less than 1.0 g/cm$^3$ (e.g., polypropylene), as well as binder materials (e.g., latex adhesive and calcium carbonate filler), and impurities (e.g., dirt and metal), is shred, impacted, and screened in the dry phase to remove binder materials and impurities. This primary size reduction yields a fragmented carpet feedstock that includes face fibers and backing fibers, as well as residual binder materials and residual impurities.

The fragmented carpet feedstock is further reduced, likewise in the dry phase, to yield size-reduced face fibers and size-reduced backing fibers, as well as the residual binder materials and the residual impurities, which are then screened through at least one screen having an effective screen size of less than about 20 mm (e.g., via a first screen having an effective screen size of less than about 20 mm and a second screen having an effective screen size of less than about 10 mm). Such screening ensures that the final size reduction is achieved before centrifugal separation. Additionally, screening can be employed to further remove binder and impurities to thereby increase the concentration of size-reduced fibers.

The size-reduced face fibers and size-reduced backing fibers (as well as the residual binder materials and impurities) are then slurried in water and the size-reduced fibers are centrifuged to separate the size-reduced face fibers from the size-reduced backing fibers. Those having ordinary skill in the art will appreciate that the residual binder materials and trace impurities tend to separate with the size-reduced face fibers.

Thereafter, in an optional step, the size-reduced face fibers, as well as the residual binder materials and trace impurities, can be dried, melt-extruded, and pelletized.

Prophetic Example

Figure 2:
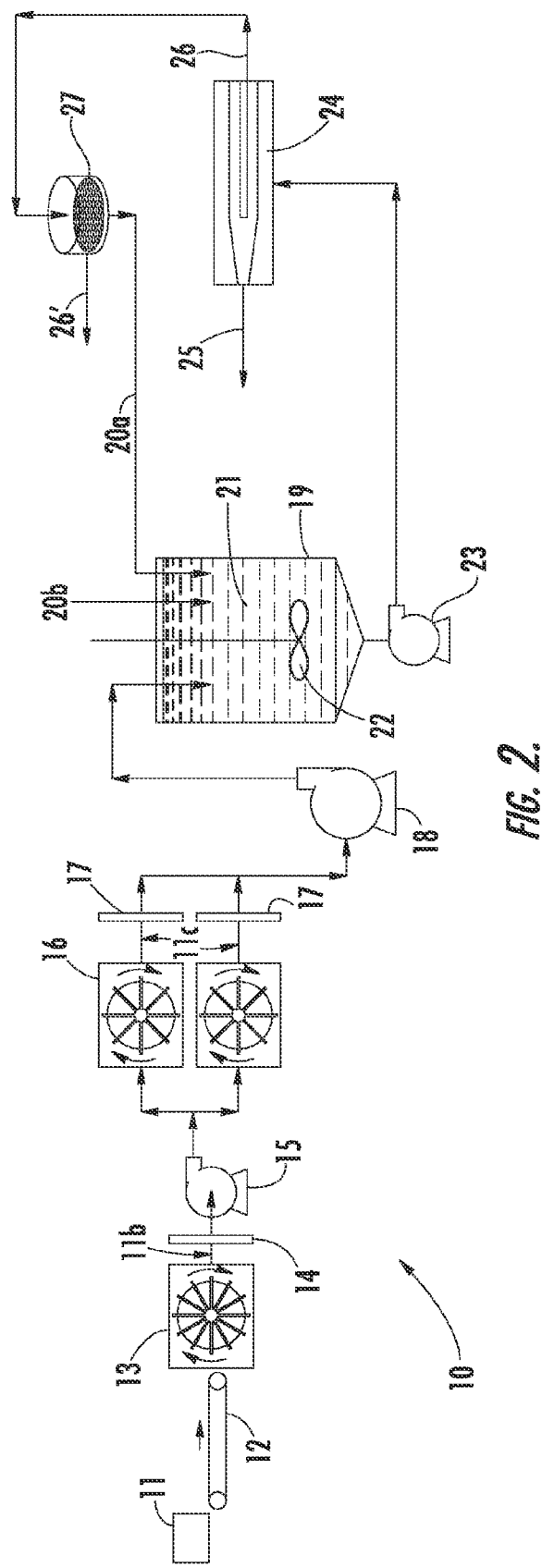
FIG. 2 schematically illustrates a representative embodiment of the carpet reclamation process.

FIG. 2 depicts an exemplary process 10 for recovering primary carpet construction components from a post-consumer whole carpet that includes about 40-45 weight percent nylon face fibers, about 10-15 weight percent polypropylene fabric backing fibers, about 30-35 weight percent binder (i.e., about 25-30 weight percent or less calcium carbonate filler and about five weight percent or more latex adhesive), and about 5-20 weight percent impurities (e.g., dirt, metal, and other debris).

The whole carpet feedstock 11 is delivered via a conveyor belt system 12 to primary size-reduction operations, which are depicted by a shredder 13 and its integrated screen 14. The shredder 13 effectively rips the whole carpet feedstock 11 into fragmented carpet materials 11b, which are screened by a one-inch screen 14. The screen 14 not only ensures that the initial target size reduction is achieved but also removes binder and impurities. As described previously, these primary size-reduction operations can further include a stationary knife hog, a hammermill, or both, as well as additional screening. The primary size-reduction operations can readily remove upwards of 90 percent of the binder and impurities from whole carpet feedstock 11.

The fragmented carpet materials 11b are then passed via a blower 15 to secondary size-reduction operations, which are depicted by granulators 16 and integrated screens 17. The granulators 16 further reduce the fragmented carpet materials 11b into granulated carpet materials 11c of a size that is suitable for subsequent centrifugal separation. In this regard, the granulated carpet materials 11c include size-reduced face fibers and size-reduced backing fibers, as well as residual binder and residual impurities. The desired fiber size is achieved by passing the granulated carpet materials 11c through screens 17 having an effective screen size of about 5/16 inch (i.e., about 8 mm). Subjecting the granulated carpet materials 11c to the screens 17 yields size-reduced face fibers possessing a mean length of about 5 mm.

The granulated carpet materials 11c are then passed via a blower 18 to a mix tank 19. There, the granulated carpet materials 11c, which, as noted, include size-reduced fibers as well as residual binder and residual impurities, are combined with an aqueous liquid media, which includes both recycled water 20a and freshwater make-up 20b, to form a size-reduced fiber slurry 21. The size-reduced fiber slurry 21, which is continuously mixed within mix tank 19 by an agitator 22, contains between about three and four weight percent solids.

The size-reduced fiber slurry 21 is transported by a pump 23 to a single-cone centrifuge 24 for density separation. The single-cone centrifuge 24 is operated between about 3000 and 5000 RPMs to yield a mostly dry first output stream 25 of mostly nylon face fibers and residual binder and a second output stream 26 of mostly polypropylene fabric backing fibers and water.

On a wet basis, the first output stream 25 is more than about 80 weight percent solids, whereas the second output stream 26 is less than about five weight percent solids. On a dry basis, the first output stream 25 is more than about 80 weight percent nylon fibers, less than about five weight percent polypropylene fibers, and more than about ten weight percent residual binder and impurities. On a dry basis, the second output stream 26 is about 90 percent or more pure polypropylene fibers.

The recovered nylon in the first output stream 25 is suitable for further processing, such as melt-extrusion into pellets or filaments. The second output stream 26 is dewatered via a vibrating screen 27 to separate the polypropylene fibers 26' from the water 20a. The recovered polypropylene fibers 26' are suitable for melt-extrusion into pellets or filaments. As noted, the water 20a is recycled into the mix tank 19.

In the specification and figures, typical embodiments of the invention have been disclosed. Specific terms have been used only in a generic and descriptive sense, and not for purposes of limitation. The scope of the invention is set forth in the following claims.

The invention claimed is:

1. A method of recovering components from whole carpet that includes face fibers having a density greater than 1.0 g/cm$^3$, fibrous olefin fabric backing having a density less than 1.0 g/cm$^3$, and binder materials, the method comprising:
   mechanically disintegrating and screening the whole carpet to yield fragmented carpet materials comprising face fibers, olefin backing fibers, and residual binder materials;
   further reducing the fragmented carpet materials to yield size-reduced face fibers and size-reduced olefin backing fibers, as well as residual binder materials;
   mixing the size-reduced fibers and residual binder materials in an aqueous liquid medium to form a size-reduced fiber slurry; and
   centrifuging the size-reduced fiber slurry in a centrifuge to separate the face fibers and residual binder materials from the olefin backing fibers.

2. A method of recovering components from whole carpet according to claim 1, wherein the face fibers consist essentially of nylon fibers.

3. A method of recovering components from whole carpet according to claim 1, wherein the face fibers consist essentially of polyester fibers.

4. A method of recovering components from whole carpet according to claim 1, wherein the fibrous olefin fabric backing consists essentially of polypropylene fibers.

5. A method of recovering components from whole carpet according to claim 1, wherein the binder materials comprise adhesive and mineral filler.

6. A method of recovering components from whole carpet according to claim 1, wherein the binder materials comprise latex adhesive and at least about 70 weight percent calcium carbonate filler.

7. A method of recovering components from whole carpet according to claim 1, wherein the step of reducing the fragmented carpet materials comprises passing the size-reduced face fibers, the size-reduced olefin backing fibers, and the residual binder materials through a screen having an effective screen size of less than about 20 mm.

8. A method of recovering components from whole carpet according to claim 1, wherein the step of reducing the fragmented carpet materials comprises passing the size-reduced face fibers, the size-reduced olefin backing fibers, and the residual binder materials through a screen having an effective screen size of between about 5 mm and 15 mm.

9. A method of recovering components from whole carpet according to claim 1, wherein the step of reducing the fragmented carpet materials comprises passing the size-reduced face fibers, the size-reduced olefin backing fibers, and the residual binder materials through a screen having an effective screen size of between about 7 mm and 10 mm.

10. A method of recovering components from whole carpet according to claim 1, wherein the step of reducing the fragmented carpet materials comprises passing the size-reduced face fibers, the size-reduced olefin backing fibers, and the residual binder materials through a screen having an effective screen size of about 8 mm.

11. A method of recovering components from whole carpet according to claim 1, wherein the step of reducing the fragmented carpet materials comprises passing the size-reduced face fibers, the size-reduced olefin backing fibers, and the residual binder materials through a series of two or more screens, wherein at least two of the screens have an effective screen size of less than about 20 mm and at least one of the screens has an effective screen size of less than about 10 mm.

12. A method of recovering components from whole carpet according to claim 1, wherein the step of reducing the fragmented carpet materials comprises passing the size-reduced face fibers, the size-reduced olefin backing fibers, and the residual binder materials through one screen having an effective screen size of less than about 15 mm and a second screen having an effective screen size of less than about 8 mm.

13. A method of recovering components from whole carpet according to claim 1, wherein the size-reduced face fibers have a mean length of less than about 15 mm.

14. A method of recovering components from whole carpet according to claim 1, wherein the size-reduced face fibers have a mean length of less than about 10 mm.

15. A method of recovering components from whole carpet according to claim 1, wherein the size-reduced face fibers have a mean length of between about 3 mm and 7 mm.

16. A method of recovering components from whole carpet according to claim 1, wherein the size-reduced face fibers have a median length of less than about 15 mm.

17. A method of recovering components from whole carpet according to claim 1, wherein the size-reduced face fibers have a median length of less than about 10 mm.

18. A method of recovering components from whole carpet according to claim 1, wherein the aqueous liquid medium consists essentially of water.

19. A method of recovering components from whole carpet according to claim 1, wherein the aqueous liquid medium comprises water and defoamer.

20. A method of recovering components from whole carpet according to claim 1, wherein the aqueous liquid medium comprises water and detergent.

21. A method of recovering components from whole carpet according to claim 1, wherein the size-reduced fiber slurry comprises less than about ten weight percent solids.

22. A method of recovering components from whole carpet according to claim 1, wherein the size-reduced fiber slurry comprises between about two and five weight percent solids.

23. A method of recovering components from whole carpet according to claim 1, wherein the size-reduced fiber slurry comprises less than about five weight percent size-reduced fibers.

24. A method of recovering components from whole carpet according to claim 1, wherein the size-reduced fiber slurry comprises between about one and two weight percent size-reduced fibers.

25. A method of recovering components from whole carpet according to claim 1, wherein the step of centrifuging the size-reduced fiber slurry yields a first output stream and a second output stream.

26. A method of recovering components from whole carpet according to claim 25, wherein the first output stream, on a dry basis, comprises at least about 80 weight percent face fibers.

27. A method of recovering components from whole carpet according to claim 25, wherein the second output stream, on a dry basis, comprises at least about 90 weight percent olefin backing fibers.

28. A method of recovering components from whole carpet according to claim 25, wherein the first output stream, on a wet basis, is at least about 75 weight percent solids.

29. A method of recovering components from whole carpet according to claim 1, wherein the step of centrifuging the size-reduced fiber slurry comprises centrifuging the slurry in a single-cone centrifuge to separate the face fibers and residual binder materials from the olefin backing fibers.

* * * * *